No. 764,345. PATENTED JULY 5, 1904.
J. F. BYERS.
MACHINE FOR DISTRIBUTING POWDERED MATERIALS.
APPLICATION FILED MAY 12, 1903.
NO MODEL. 3 SHEETS—SHEET 1.
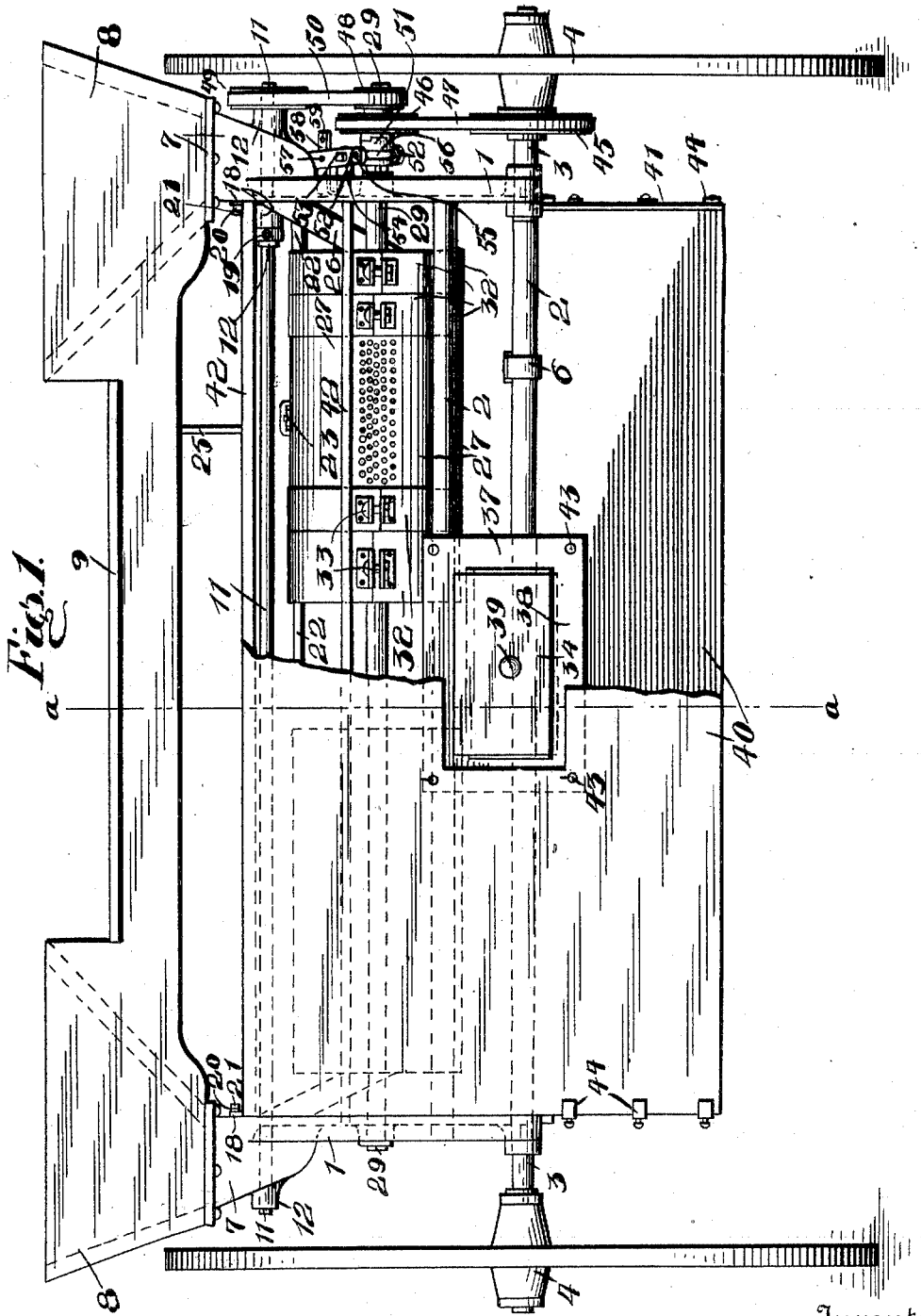
Witnesses
Inventor
John F. Byers.
By E. N. Barber,
Attorney.

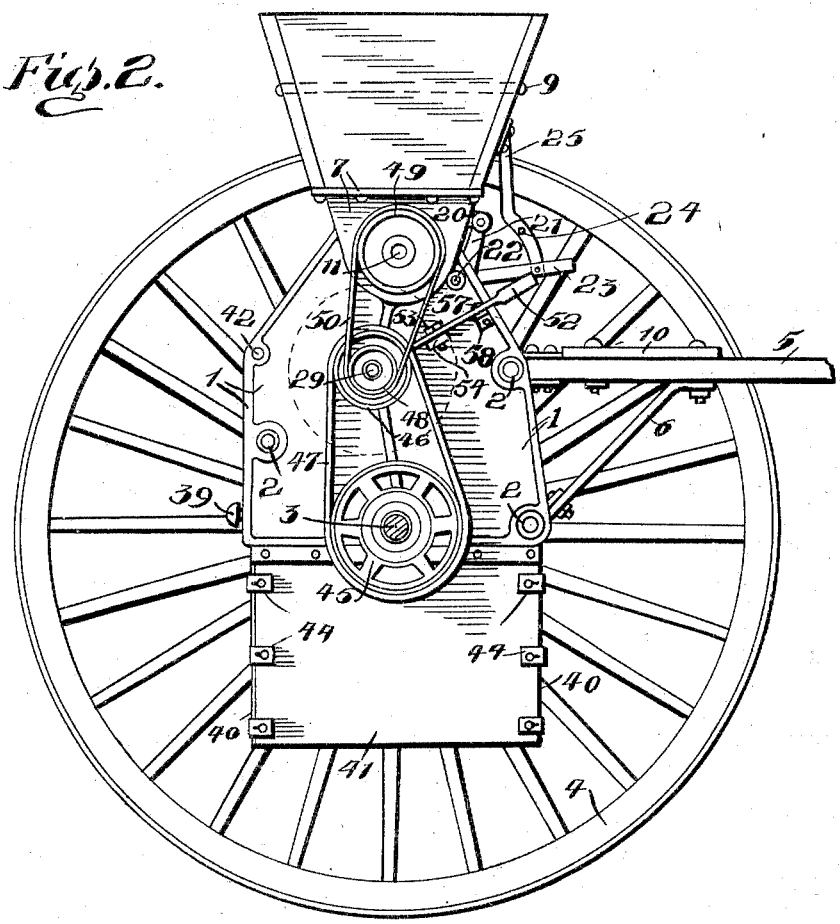

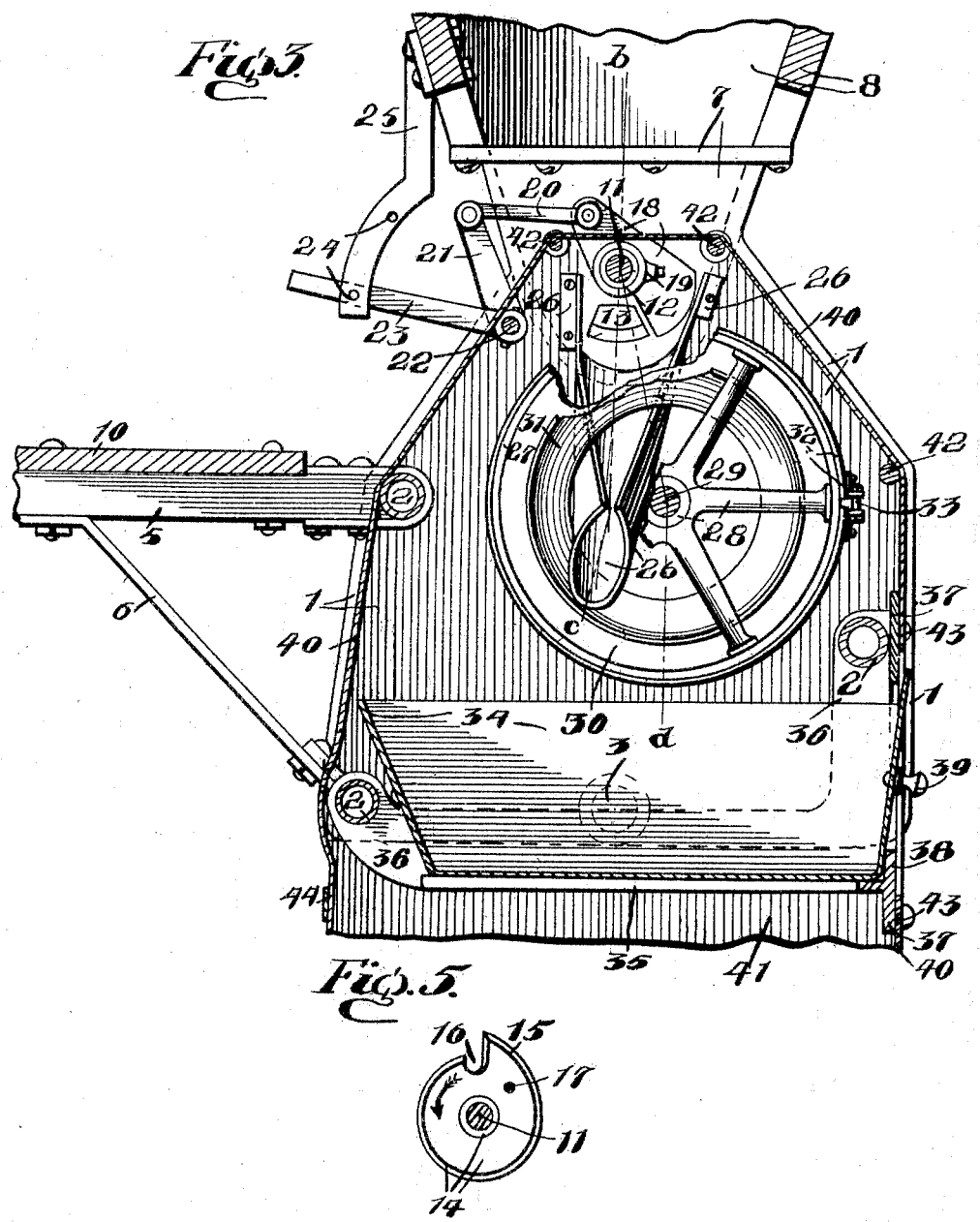

No. 764,345.

Patented July 5, 1904.

UNITED STATES PATENT OFFICE.

JOHN F. BYERS, OF RAVENNA, OHIO.

MACHINE FOR DISTRIBUTING POWDERED MATERIALS.

SPECIFICATION forming part of Letters Patent No. 764,345, dated July 5, 1904.

Application filed May 12, 1903. Serial No. 156,767. (No model.)

*To all whom it may concern:*

Be it known that I, JOHN F. BYERS, a citizen of the United States of America, and a resident of Ravenna, in the county of Portage and State of Ohio, have invented certain new and useful Improvements in Machines for Distributing Powdered Material, of which the following is a specification.

My invention relates to improvements in machines for applying a poisonous dust to potato or other plants for the purpose of destroying parasites. The material applied in this way is usually composed of a powdered poisonous substance, like paris-green, mixed with a much larger quantity of powdered land-plaster, lime, or ashes; and the objects of my invention are to produce a machine for applying such a powdered material in the form of a dust to plants growing in rows.

Further objects of the invention are to provide the machine with means for preventing the dust from being blown away by the wind before it reaches the plants, means for catching the surplus material fed to the distributing mechanism, means for varying the area of the distributing-surface in the distributing mechanism, and other features and details of construction fully hereinafter described.

I attain these objects by the mechanism illustrated in the accompanying drawings, in which—

Figure 1 is a rear elevation of the machine with a part of the inclosing cover removed; Fig. 2, an elevation of the right-hand side of the machine with the main driving-wheel removed; Fig. 3, a partial sectional elevation on the broken line $a\,a$ of Fig. 1; Fig. 4, a partial sectional elevation on broken lines $b\,c$ and $b\,d$ of Fig. 3, showing the feeding-cup in elevation with a portion of the same broken away; and Fig. 5, an elevation of the open or concave side of the feeding-cup.

Like reference-numerals refer to like parts throughout the several views.

The principal part of the framework of this machine is composed of two (right and left) side plates 1, rigidly connected together by three round tubular bars 2, two of which are located near the front edges and one near the rear edges of the plates. The plates 1 are strengthened by ribs at their edges, and to each is rigidly secured a laterally-projecting spindle-stud 3, and on these the two supporting-wheels 4 are mounted to turn. Thills 5 are secured directly to the upper front frame-bar 2, as shown, and are connected to the lower bar 2 by braces 6.

The machine as shown is designed for operating on two rows of plants at the same time and is for that reason provided with duplicate hoppers, feeding mechanisms, conductors, and distributing mechanisms, except that they are made "right" and "left" and the two feeding mechanisms and two distributing mechanisms have their respective operating-shafts in common. The following description may therefore be confined to but one of the two duplicate systems.

At the top end of each of the frame-plates 1 and integral therewith there is formed a hollow pocket or hopper-like projection 7, open and flanged at the top, to which is secured a bottomless hopper 8, which, together with the pocket 7, forms a complete hopper for carrying a supply of powdered material. As shown, the hoppers 8 are made of wood with their side pieces common to both hoppers and extending across the machine from one hopper to the other, and to their narrower portion between the hoppers is secured a board 9, forming a seat for the driver. A footboard 10 is secured to the thills.

A rotary horizontal feeding-shaft 11 extends across the machine, passing through the hopper-pockets 7 and having bearings in bearing projections 12.

There is an opening 13 through the vertical side wall of the pockets 7 or plates 1 near the bottom of the pocket.

Within each hopper-pocket 7, mounted on and secured to turn with shaft 11, is a hemispherically-shaped feeding-cup 14, arranged with its open side adjacent to the vertical wall of the pocket and just covering the opening 13. The feeding-cup 14 is provided with an outwardly-projecting lip 15, formed by extending a portion of its wall outwardly by an easy curve and leaving a notch 16 in the cup-wall between the extended and the main portions thereof. A stud or finger 17 is made fast in the vertical wall of the pocket and projects laterally therefrom into the interior of the cup at a point about midway between its center and outer edge. There may be as many of these studs as is desired. For closing the opening 13 a flat plate-cover 18, provided with a bearing-hub, is mounted to oscillate on the bearing projection 12 above the said opening and is held in place thereon against the vertical wall by a retaining-collar 19, secured to the said bearing projection. A connecting-rod 20 is pivotally connected to the upper extremities of the cover-plate 18 and a rocker-arm 21, rigidly mounted on a rock-shaft 22. This rock-shaft extends across the machine with bearings in the frame-plates 1, and to it both covers 18 are connected and may thus be operated by a hand-lever 23, properly mounted on the rock-shaft within easy reach of the driver. For retaining the covers at either extremity of their movement the hand-lever 23 is made thin enough to be easily sprung sidewise and provided with a laterally-projecting stud, which by springing and moving the lever may be made to enter either of the two holes 24 in a retainer 25. When the machine is working, the feeding-cup has a continuous rotary motion that causes the inclined lip 15 to continually gather the material in the hopper-pocket into the cup and feed it through the opening 13. The stationary finger 17, projecting into the feeding-cup, is for the purpose of preventing the cup from being clogged by the packing of the powdered material. From the hopper-pocket the dust material falls into a spout 26, attached to the frame-plate 1, and is conducted into a hollow distributing-cylinder 27, made of perforated sheet metal and supported by one or more spiders 28, mounted to turn with a rotary shaft 29, extending across the machine and having bearings in the frame-plates 1. One end of the distributing-cylinder is open; but the intake end is provided with a sheet-metal head 30, having a central opening large enough to permit the spout 26 to enter at one side of shaft 29 and a flange or deflector ring 31, of sheet metal, shaped like the frustum of a cone attached to said head and projecting and flaring into said cylinder, as shown in Fig. 4. The head 30 permits the distributer to carry a quantity of powdered material, which as the distributer rotates is alternately being carried upward by adhesion and falling forward and downward, and thus works along lengthwise of the distributer and is continually sifting through the perforations and mingling with the air, forming a heavy dust that is thus comparatively evenly distributed on all the plant-surfaces. Some of the material adhering to the cylinder-wall is carried to its highest limit before falling. Without the flange-ring 31 when the discharge end of the cylinder is the higher end the plane in which the intake-opening lies is so thrown out of perpendicular that this falling material would pass through the said opening out of the cylinder; but with the funnel-shaped flange-ring 31, secured to the cylinder-head, encircling, and thus always overhanging, the intake-opening and flaring toward the interior of the cylinder this falling material strikes the upper exterior surface of the flange-ring and is thus intercepted and prevented from escaping from the cylinder, while the material that falls through the plane bounded by the inner edge of the flange-ring strikes the lower inner surface of said ring and is deflected away from the intake-opening back into the cylinder. The distributing-surface of the distributers may be limited as desired by bands of sheet metal 32, removably secured thereto, thus preventing the dust material from sifting through the perforations covered. In Fig. 1 a distributer is shown with two bands at each end secured by stove-bolts 33, as more clearly shown in Fig. 3. In Fig. 4 no bands are shown on the distributer. The surplus dust material after passing longitudinally through the distributer falls into a removable sheet-metal drawer 34, located at the center of the machine to catch the surplus from both distributers. The drawer 34 rests on supporting-ledges 35 between guides 36 and is removable through a rectangular opening in a face-plate 37, a part of which forms a retaining-lip 38 for keeping the drawer in place. The face-plate, guides, and ledges are all connected together and secured to two of the frame-bars 2, as shown in Fig. 3. To remove the drawer, one end must first be raised above the retaining-lip 38 by the knob 39.

To protect the driver from the dust and to prevent the wind from blowing the dust away, a canvas cover 40 is provided, which, together with the frame-plates 1 and two sheet-metal frame-plate extensions 41, forms an envelop open on the under side inclosing the conducting and distributing mechanism, the frame-bars 2, and a space extending down as near to the plants as is desired. The canvas cover is supported by three rods 42, provided for that purpose and secured to the frame-plates 1, has openings for the thill connections, rocker-arms, and drawer 34, and is secured to the face-plate 37 by stud-buttons 43 and also to extension 41 by short straps 44 and stud-buttons.

The right-hand supporting-wheel 4 is also the driving-wheel for turning the shafts 29 and 11, and to its hub is secured a driving-pulley 45. On the shaft 29 is mounted a "loose" clutch-pulley 46, adapted to be driven by a belt 47 from pulley 45, and a "tight" driving-pulley 48, adapted to drive a pulley 49 tight on shaft 11 by a belt 50. While I have here shown belt-and-pulley transmission mechanism, any other that is suitable may be used, such as chain-and-sprocket and spur gearing. The part of shaft 29 on which the pulleys are mounted is reduced in size to form a shoulder for keeping the clutch-pulley in place. A clutch-sleeve 51 is mounted to slide longitudinally on shaft 29 and connected by keyway and spline to turn the same. The adjacent ends of the clutch-sleeve and pulley-hub 46 are provided with clutch members adapted to interlock, as shown in Fig. 1, to drive shaft 29. For shifting the clutch-sleeve a lever 52, having a forked end adapted to reach to opposite sides of said sleeve, is connected by a fulcrum-bolt 53 to a lug 54, projecting laterally from plate 1. The ends of the prongs of the forked end of the clutch-lever 52 are provided with studs 55, projecting therefrom into an encircling groove 56 in the periphery of the clutch-sleeve, thus adapting them to shift the sleeve and allow it to turn freely. The clutch-lever extends forward where it may be reached by the driver, is adapted to be sprung upward, and provided with a stud 57 for engaging with a retainer 58, having two holes 59 for holding the clutch-sleeve either in or out of engagement with the hub 46 and is operated and held in the same way as lever 23.

The machine may of course be adapted to treat more than two rows at once by adding more feeding and distributing mechanisms arranged substantially as those shown.

What I claim as my invention, and desire to secure by Letters Patent, is—

1. In a machine for distributing powdered materials, a hollow cylinder mounted and connected to rotate on its axis, and a head having a central opening and partially closing one end of the cylinder, in combination with a funnel-shaped flange-ring projecting from the edge of said head bounding said opening and flaring, or with its flaring side toward the interior of the cylinder, substantially as and for the purpose specified.

2. In a machine for distributing powdered materials, a hopper, a feeding device, a hollow and perforated distributing-cylinder mounted and connected to rotate on its axis, a head for said cylinder having a central opening, and means for transferring the material to be distributed from the hopper to the cylinder, in combination with a funnel-shaped flange-ring projecting from the edge of said head bounding said opening and flaring or with its flaring side toward the interior of the cylinder, substantially as and for the purpose set forth.

3. In a machine for distributing powdered material, two hollow and perforated distributing-cylinders mounted on a rotary shaft, each open at one end and adapted to receive the material, in combination with a pan adapted and arranged to receive the surplus material from both distributers.

4. In a machine for distributing powdered material, two hollow and perforated distributing-cylinders mounted on a rotary shaft, each open at one end and adapted to receive the material, and a pan adapted to receive the surplus material from both distributers, in combination with a hopper, a feeding device and a conductor for each cylinder.

5. In a machine for distributing powdered material, a hopper having a pocket with a vertical wall through which is an outlet-opening, a distributer and a conductor leading from the hopper-pocket to the distributer, in combination with a feeding-cup within the hopper-pocket, having a lip and a notch, and mounted on and to turn with a horizontal rotary shaft with its open side adjacent to the vertical wall.

6. In a machine for distributing powdered material, a hopper having a pocket with a vertical wall through which is an outlet-opening, a distributer and a conductor leading from the hopper-pocket to the distributer, in combination with a feeding-cup within the hopper-pocket, having a lip and a notch, and mounted on and to turn with a horizontal rotary shaft with its open side next to the vertical wall, and a stud projecting from said wall into the interior of the cup.

7. In a machine for distributing powdered material, a hopper-pocket having a vertical wall through which is an outlet-opening, in combination with a feeding-cup within the pocket, having a lip and a notch, and mounted on and to turn with a horizontal shaft, with its open side next to the vertical wall.

8. In a machine for distributing powdered material, a hopper-pocket having a vertical wall through which is an outlet-opening, in combination with a feeding-cup within the pocket having a lip and a notch and mounted on and to turn with a horizontal rotary shaft with its open side next to the vertical wall, and a stud projecting from said wall into the interior of the cup.

9. In a machine for distributing powdered material, a plurality of hopper-pockets, each having a vertical wall through which is an outlet-opening, in combination with a feeding-cup within each pocket; all of said cups mounted on and to turn with one horizontal rotary shaft with their open sides next to the vertical walls and each having a lip and a notch.

10. In a machine for distributing powdered material, a plurality of hopper-pockets each having a vertical wall through which is an outlet-opening in combination with a feeding-cup within each pocket, and a stud projecting from each vertical wall into its respective cup; all of said cups mounted on and to turn with one horizontal rotary shaft with their open sides next to the vertical walls, and each having a lip and a notch.

11. In a machine for distributing powdered material, a plurality of hopper-pockets each having a vertical wall through which is an outlet-opening, and a feeding-cup within each pocket, the cups all mounted on and to turn with one horizontal rotary shaft and each having a lip and a notch, in combination with a hollow and perforated distributing-cylinder for each hopper-pocket, all mounted on and to turn with a horizontal rotary shaft and means for transferring the material from the hopper-pockets to the distributing-cylinders.

12. In a machine for distributing powdered material, a hopper having a pocket with a vertical wall through which is an outlet-opening, and a feeding-cup within the pocket mounted on and to turn with a horizontal rotary shaft and having a lip and a notch, in combination with a hollow and perforated distributing-cylinder mounted on and to turn with a horizontal rotary shaft, and means for transferring the material from the hopper-pocket to the distributing-cylinder.

13. In a machine for distributing powdered material, a frame mounted on wheels and a distributer supported by the frame and adapted to receive and distribute powdered material, in combination with a flexible cover having an opening and secured to and supported by said frame and partly inclosing the distributer, and a pan adapted to receive the surplus material from the distributer and removable through said opening.

Signed at Ravenna, Ohio, this 22d day of April, 1903.

JOHN F. BYERS.

Witnesses:
H. L. BEATTY,
F. W. JONES.